(12) United States Patent  
Witcher et al.

(10) Patent No.: US 8,763,495 B2
(45) Date of Patent: Jul. 1, 2014

(54) TORQUE TUBE, TORQUE TRANSFER APPARATUS AND METHOD

(75) Inventors: Bryan A. Witcher, Erie, PA (US); Carlos A. Vallejo, Erie, PA (US)

(73) Assignee: General Electric Company, Schenectady, NY (US)

(*) Notice: Subject to any disclaimer, the term of this patent is extended or adjusted under 35 U.S.C. 154(b) by 266 days.

(21) Appl. No.: 13/025,865

(22) Filed: Feb. 11, 2011

(65) Prior Publication Data

US 2012/0205966 A1 Aug. 16, 2012

(51) Int. Cl.
*F16H 57/02* (2012.01)
*B60K 17/04* (2006.01)
*B23P 11/02* (2006.01)

(52) U.S. Cl.
USPC .................. 74/607; 180/372; 29/447

(58) Field of Classification Search
USPC ............ 74/606 R, 607; 29/447, 893.1, 893.2, 29/894.361; 180/363, 372, 374, 383, 385, 180/65.51, 65.56; 277/358–369, 306, 390; 301/105.1, 106, 109, 110, 111.01, 301/111.02, 111.04, 137, 36.1; 475/5, 331
See application file for complete search history.

(56) References Cited

U.S. PATENT DOCUMENTS

| | | |
|---|---|---|
| 2,386,917 A | 10/1945 | Thornton |
| 2,543,811 A | 3/1951 | Snow et al. |
| 3,042,145 A | 7/1962 | Bixby |
| 3,055,448 A | 9/1962 | Fagel |
| 3,951,481 A | 4/1976 | Ritter, Jr. |
| 4,140,198 A | 2/1979 | Chamberlain |
| 4,158,972 A * | 6/1979 | Chamberlain ................ 475/337 |
| 4,186,626 A | 2/1980 | Chamberlain |
| 4,207,968 A | 6/1980 | Chamberlain |
| 4,380,274 A | 4/1983 | Abraham et al. |
| 4,461,373 A | 7/1984 | Pratt et al. |
| 4,649,772 A | 3/1987 | Daniel et al. |
| 4,662,246 A * | 5/1987 | Cheek et al. ................ 475/338 |
| 4,873,894 A | 10/1989 | Avery et al. |
| 5,018,750 A * | 5/1991 | Sparks et al. ................ 277/353 |
| 5,174,839 A * | 12/1992 | Schultz et al. ............... 152/415 |
| 5,272,930 A * | 12/1993 | Nakamura et al. ............. 74/434 |
| 5,472,062 A | 12/1995 | Nagai et al. |
| 6,135,259 A | 10/2000 | Forster |

(Continued)

FOREIGN PATENT DOCUMENTS

| | | | | |
|---|---|---|---|---|
| DE | 4101222 A1 * | 7/1991 | ............. | B60B 27/00 |
| EP | 2213498 A1 | 8/2010 | | |
| JP | 01034614 A * | 2/1989 | ............. | B23P 11/02 |

OTHER PUBLICATIONS

Search Report and Written Opinion from corresponding PCT Application No. PCT/US2012/024909 dated May 29, 2012.

*Primary Examiner* — Troy Chambers
*Assistant Examiner* — Jake Cook
(74) *Attorney, Agent, or Firm* — GE Global Patent Operation; John A. Kramer

(57) ABSTRACT

A torque tube includes a ring gear having a first axial end, a second axial end opposite the first axial end, an inner surface including a plurality of teeth, and an outer surface with a mating portion formed adjacent to the first axial end of the ring gear. The torque tube also includes a barrel portion joined to the second axial end of the ring gear at a radial location inward from a radial location of the mating portion. The barrel portion extends axially away from the ring gear.

19 Claims, 5 Drawing Sheets

(56) References Cited

U.S. PATENT DOCUMENTS

| | | |
|---|---|---|
| 6,582,339 B2 | 6/2003 | Damm et al. |
| 6,588,538 B2 | 7/2003 | Hinton et al. |
| 6,651,762 B1 * | 11/2003 | Hokanson et al. ......... 180/65.51 |
| 7,022,039 B2 | 4/2006 | Hasegawa et al. |
| 7,578,763 B2 | 8/2009 | Morita |
| 7,585,244 B2 | 9/2009 | Jurado et al. |
| 7,621,835 B2 | 11/2009 | Oshidari |
| 8,062,160 B2 * | 11/2011 | Shibukawa ................... 475/150 |
| 2004/0187287 A1 * | 9/2004 | Davies et al. ................... 29/447 |
| 2007/0240538 A1 * | 10/2007 | Hibbler et al. ................. 74/607 |
| 2009/0102275 A1 | 4/2009 | Rivera et al. |
| 2009/0283345 A1 | 11/2009 | Kabrick |
| 2010/0191417 A1 * | 7/2010 | Murahashi et al. ............. 701/36 |
| 2012/0248856 A1 * | 10/2012 | Knopf et al. .................. 301/109 |

* cited by examiner

TORQUE TUBE, TORQUE TRANSFER APPARATUS AND METHOD

FIELD OF THE INVENTION

Embodiments of the invention relate to wheel drive assemblies, and, more particularly, to torque tubes for use in wheel drive assemblies of off-highway vehicles,

BACKGROUND OF THE INVENTION

Off-highway vehicles ("OHVs"), such as mining vehicles used to haul heavy payloads, typically employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine drives the alternator and the alternator, in turn, powers the main traction inverter thereby supplying electrical power having a controlled voltage and frequency to electric drive motors of the wheel drive assemblies. Each wheel drive assembly houses a planetary gear transmission that converts the rotation of the associated drive motor energy into a high torque, low speed rotational energy output which is supplied to the wheels.

Planetary gear transmissions are generally operated in a wet lubricated condition. As will be appreciated, it is generally desirable to minimize or prevent leakage of lubricants, e.g., oil, from wheel drive assemblies as such leakage leads to vehicle downtime for disassembly, inspection and repair.

In particular, OHV wheel assemblies typically include torque tubes to facilitate torque transfer to the wheels of the OHV. Torque tubes are generally secured to a body portion of an oil seal by an interference fit, i.e., a fastening achieved by friction between the parts. For metal parts in particular, the friction that holds the parts together is often greatly increased by compression of one part against the other. As such, interference fits are often used for releasably securing parts in an essentially permanent fashion that, once established, is not dependent on fasteners.

Interference fits, however, rely upon compressive stresses in the fitted interference surfaces and, as a result, stress profiles superimposed on those surfaces during torque transfer can periodically partially relax an interference fit. Repeated partial relaxation and re-establishment of an interference fit could potentially, over time, adversely affect the interference surfaces resulting in a gap between the surfaces sufficient for leakage of oil.

In view of the above, it is desirable to provide a torque tube in which cyclic torsional loading does not adversely affect the interference fit between the torque tube and an oil seal attached thereto. It is also desirable to provide a torque tube that is easily and inexpensively manufactured.

BRIEF DESCRIPTION OF THE INVENTION

In one embodiment of the invention, a torque tube includes a ring gear having a first axial end, a second axial end opposite the first axial end, an inner surface including a plurality of teeth, and an outer surface with a mating portion formed adjacent to the first axial end of the ring gear. The torque tube also includes a barrel portion joined to the second axial end of the ring gear at a radial location inward from a radial location of the mating portion. The barrel portion extends axially away from the ring gear.

In another embodiment of the invention, a torque transfer apparatus includes a ring gear defining an axis of the apparatus and having a first axial end, a second axial end opposite the first axial end, a radially inward facing surface including a plurality of teeth, and a radially outward facing surface with a mating portion formed proximate to the first axial end of the ring gear. The torque apparatus also includes a barrel portion joined to the second axial end of the ring gear at a radial location inward from a radial location of the mating portion. The barrel portion extends axially away from the ring gear to a flanged portion. The torque transfer apparatus also includes an annular attachment having an inward mating surface joined by an interference fit to the mating portion of the ring gear. The interference fit is maintained while torque is transferred between the ring gear and the barrel portion.

In another embodiment of the invention, a method of manufacturing a torque transfer apparatus includes joining acing gear to a barrel portion. The ring gear has a first axial end, a second axial end opposite the first axial end, a radially inward facing surface including a plurality of teeth, and a radially outward facing surface with a mating portion formed proximate to the first axial end of the ring gear. The barrel portion is joined to the ring gear at about the second axial end of the ring gear, and at a radial location inward from a radial location of the mating portion, so that the barrel portion extends axially away from the ring gear.

As used herein, the terms "substantial", "substantially", or "about" are intended to indicate a condition within reasonably achievable manufacturing and assembly tolerances, relative to an ideal desired condition suitable for achieving the functional purpose of a component or assembly. By way of an example, a "substantially" flat surface may nonetheless include small, microscopic, or perceptible roughnesses, prominences, or indentations, so long as those non-flat features do not interfere with the intended purpose of the substantially flat surface. Similarly, as another example, an assembly of components in "substantial" alignment to a common axis of rotation may deviate from perfectly co-axial alignment so tong as all the components can rotate as intended for accomplishing the functional purpose of the assembly.

"Interference fit," as used herein, also known as a press or friction fit, is a fastening between two parts which is achieved by friction between the parts, rather than by any other attachment mechanism. For metal parts in particular, the friction that holds the parts together is often greatly increased by compression of one part against the other, which relies on the tensile and compressive strengths of the materials the parts are made from. An interference fit is generally achieved by shaping the two mating parts so that one or the other (or both) slightly deviate in size from the nominal dimension. The word interference refers to the fact that one part slightly interferes with the space that the other is taking up.

"Uniplanar," as used herein, indicates an absence of axial prominences or recesses or other interlocking features between interference fit mating surfaces. Within the intended meaning of "uniplanar," however, the surfaces may include measurable roughness, circumferential ridging, or other features incidental to manufacturing.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
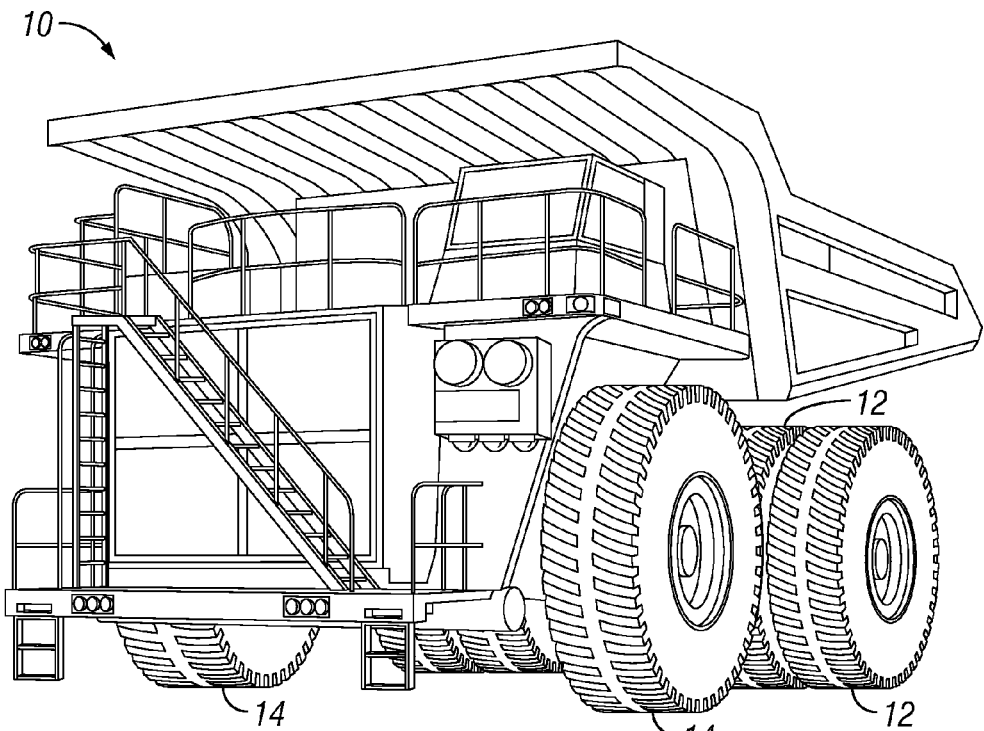
FIG. 1 shows a perspective view of an OHV.
Figure 2:
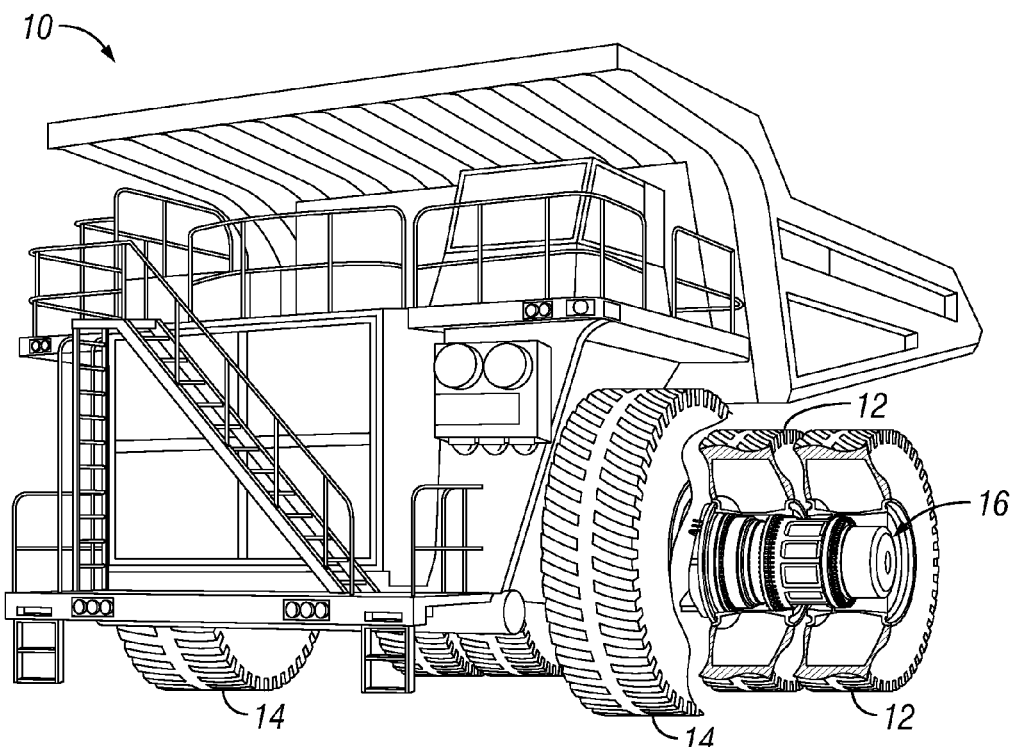
FIG. 2 shows a partial perspective cutaway view showing a wheel drive assembly of the OHV shown in FIG. 1.
Figure 3:
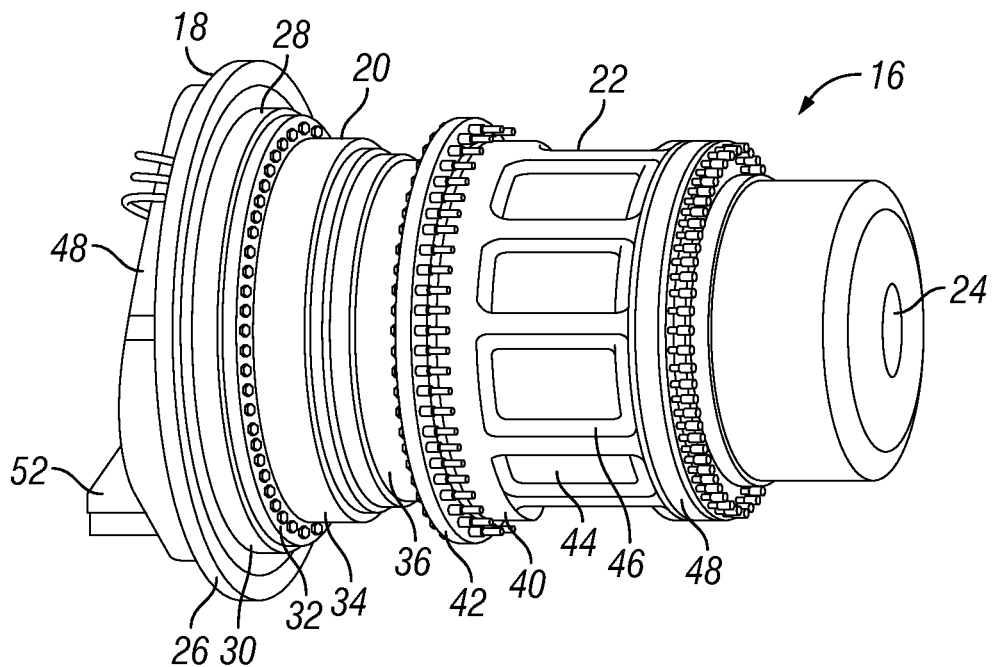
FIGS. 3 and 4 show partial side and end perspective views of the wheel drive assembly shown in FIG. 2 incorporating a torque tube in accordance with an embodiment of the present invention.
Figure 4:
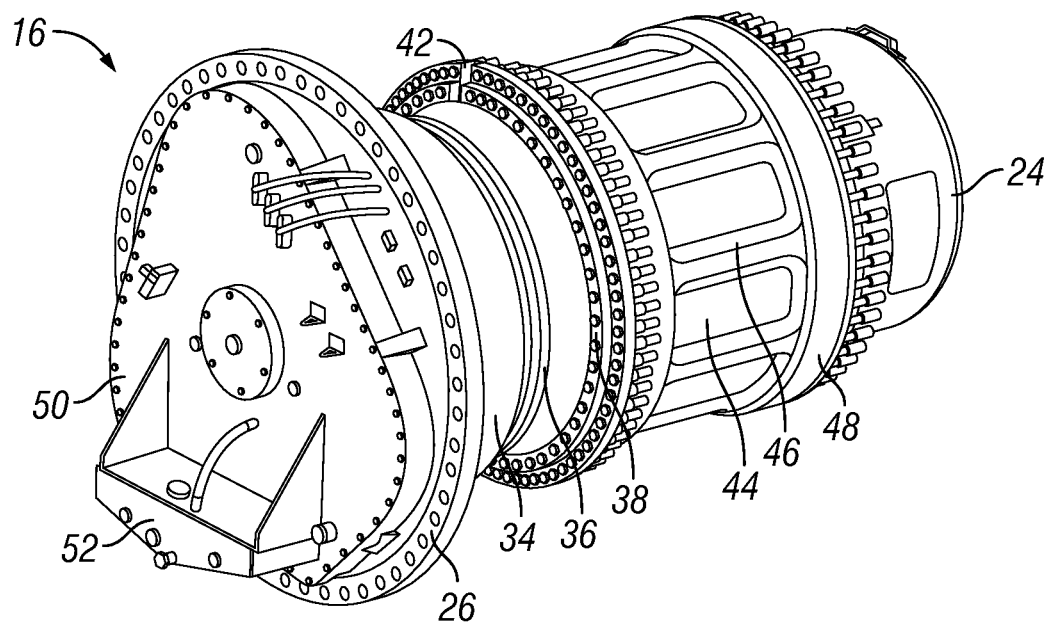

Reference will be made below in detail to exemplary embodiments of the invention, examples of which are illustrated in the accompanying drawings. Wherever possible, the same reference numerals used throughout the drawings refer to the same or like parts.

An embodiment of the inventive torque tube 20 is configured for use with a wheel assembly 16 of an OHV 10 as depicted in FIGS. 1-5. As shown, the OHV 10 is supported on paired dual rear drive tire assemblies 12 and on single front steering tire assemblies 14. Each dual rear drive tire assembly 12 is mounted on a wheel drive assembly 16, which includes a wheel frame 18 as well as the torque tube 20 and a wheel hub 22 supported on the wheel frame and fastened to the torque tube 20. The tire assemblies 12 can be bolted to the wheel hub 22 as further discussed below. The wheel frame 18 also supports a brake assembly 24, which is disposed adjacent to an outboard end of the wheel hub 22 but is not fastened to the wheel hub.

Each wheel assembly 16 can be bolted to the vehicle 10 by way of a mounting flange 26 provided on the wheel frame 18. The wheel frame 18 is radially tapered from the mounting flange 26, through a generally conical or hyperbolic transition portion 28, to a main cylindrical or substantially cylindrical tube portion shown in FIG. 5, discussed below. The torque tube 20 is disposed around the radially outward facing surface of the tube portion of the wheel flume 18. On the transition portion 28 of the wheel frame 18, an oil seal ring 30 is fixed to the wheel frame 18.

An embodiment of the inventive torque tube 20 includes a ring gear 34 adjacent to the oil seal ring 30, and also includes a barrel portion 36 that extends from the ring gear 34 along the wheel frame to a hub flange 38. On the end of the ring gear 34 adjacent to the oil seal ring 30, a complementary seal body 32 is fastened to the torque tube 20.

Figure 5:
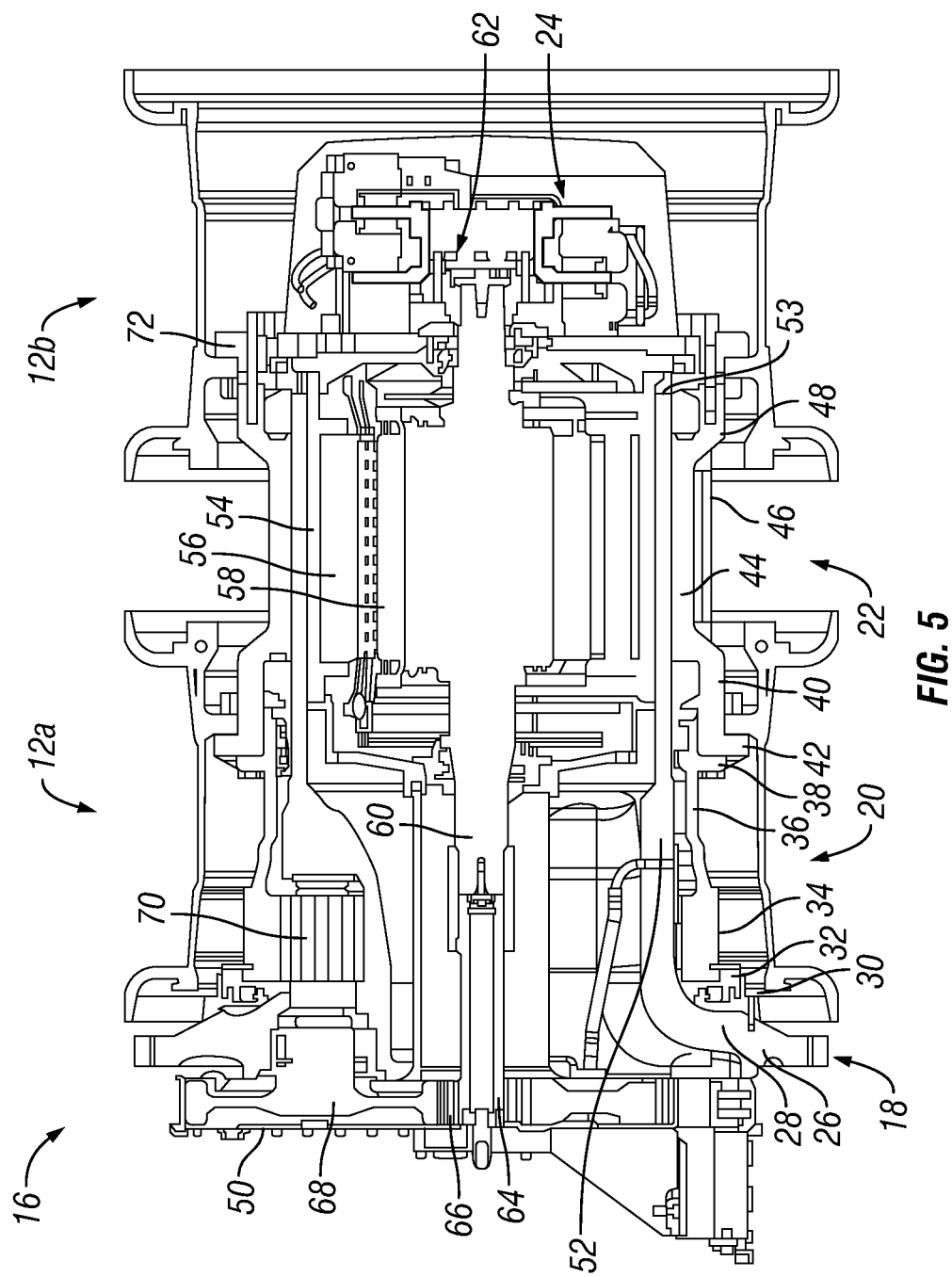
FIG. 5 shows a side sectional view of the wheel drive assembly shown in FIGS. 3 and 4.

FIG. 5 is a side sectional view illustrating multiple components of the wheel assembly 16 and their relationship to an embodiment of the inventive wheel hub 22 and wheel frame 18. As shown, at the inboard and outboard ends 40, 48 of the wheel hub 22, inboard and outboard bearings 51a, 51b, respectively, are provided to support the wheel hub on a wheel frame barrel 52. The wheel frame barrel 52 extends from the transition portion 28 to an annular hub end surface 53, to which the brake assembly 24 is mounted. Adjacent the hub end surface 53, an electric motor 54 is housed inside the wheel frame 18. The electric motor 54 includes a stator 56 and a rotor 58, from which a shaft 60 protrudes toward a first end proximate to the mounting flange 26 of the wheel frame 18, and toward a second end within the brake assembly 24. Within the brake assembly 24, a brake rotor 62 is mounted onto the second end of the shaft 60. Within the wheel frame 18, a sun gear shaft 64 is splined to the first end of the shaft 60. The sun gear shaft 64 supports a sun gear 66 housed centrally within the gear cover 50. The sun gear 66 is meshed with a plurality of planet gears 68 carried on common axles with pinion gears 70, which mesh with internal teeth of the torque tube ring gear 34. In some embodiments, there are three planet gears 68 and three pinion gears 70. The torque tube 20 is supported between the pinion gears and the wheel hub 22. The torque tube 20 is supported between the pinion gears and the wheel hub.

Referring to the wheel hub 22, an inboard tire assembly 12a (partially shown) is bolted to the rim flange 42. At the outboard end 48 of the wheel hub 22, a hub adapter 72 is bolted to the wheel hub 22 and an outboard tire assembly 12b (partially shown) is bolted to the hub adapter 72.

Figure 6:
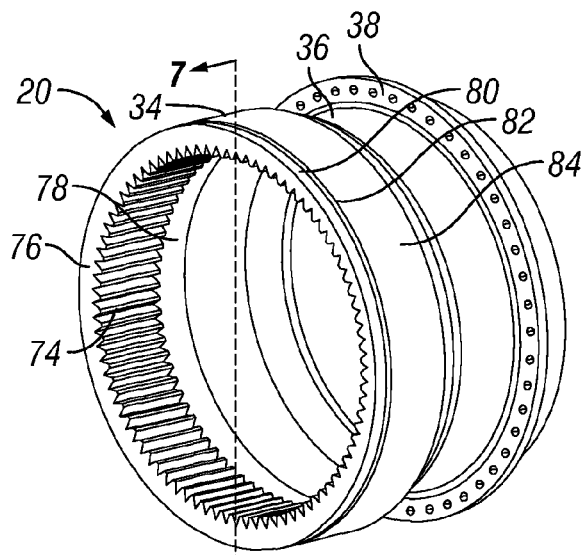
FIG. 6 shows an end perspective view of a torque tube in accordance with an embodiment of the present invention in the wheel drive assembly shown in FIG. 5.
Figure 7:
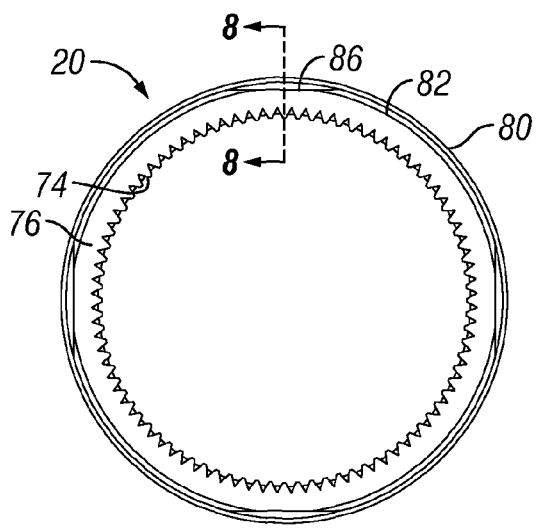
FIG. 7 shows an axial sectioned view of the torque tube shown in FIG. 6, sectioned along view plane 7-7.
Figure 8:
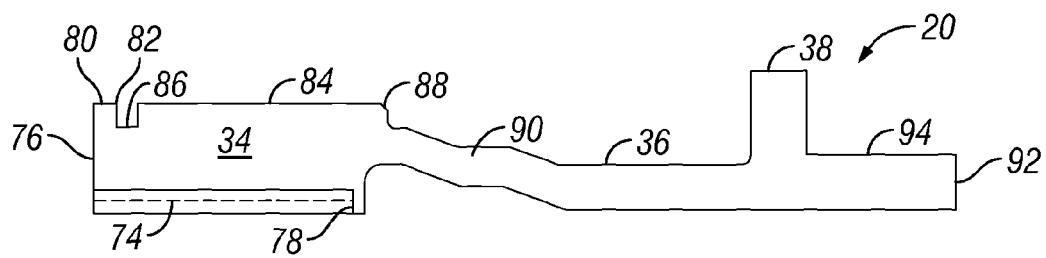
FIG. 8 shows a side sectioned view of the torque tube shown in FIGS. 6 and 7, sectioned along view plane 8-8.

FIGS. 6-8 illustrate an embodiment of the torque tube 20, including the ring gear 34, the barrel portion 36, and the hub flange 38. Referring particularly to FIGS. 7 and 8, the ring gear 34 includes internal teeth 74 that extend from an axially-facing annular sealing surface 76 along a radially inward facing surface of the ring gear 34 to a smooth inward facing surface 78 of the barrel portion 36. The ring gear 34 also includes a mating portion, such as a radially outward facing mating surface 80 configured for an interference fit into a complementary surface of the seal body 32. Adjacent to the mating surface 80 of the ring gear 34, a clamping groove 82 is provided as part of a mechanism for attaching the seal body 32 onto the ring gear 34.

The clamping groove 82 separates the closely-controlled diameter and surface finish of the mating surface 80 from the remaining radially outward facing surface 84 of the ring gear 34. Notably, as shown in FIG. 7, the radially outward facing bottom surface of the clamping groove 82 can include a plurality of flattened portions 86 that form secants to the curve of the bottom surface and to the outer surface 84 of the ring gear 34. These flattened portions or secant lands 86 enhance attachment of the seal body 32 with the ring gear 34, as further discussed below with reference to FIGS. 9 and 10.

Still referring to FIG. 8, the ring gear 34 terminates at a shoulder 88 from which a frustoconical portion 90 continues to the barrel portion 36. The barrel portion 36 extends from the frustoconical portion 90 to a hub end face 92 of the torque tube 20. The hub flange 38 protrudes radially outward from the barrel portion 36 about midway between the frustoconical portion 90 and the hub end face 92.

Figure 9:
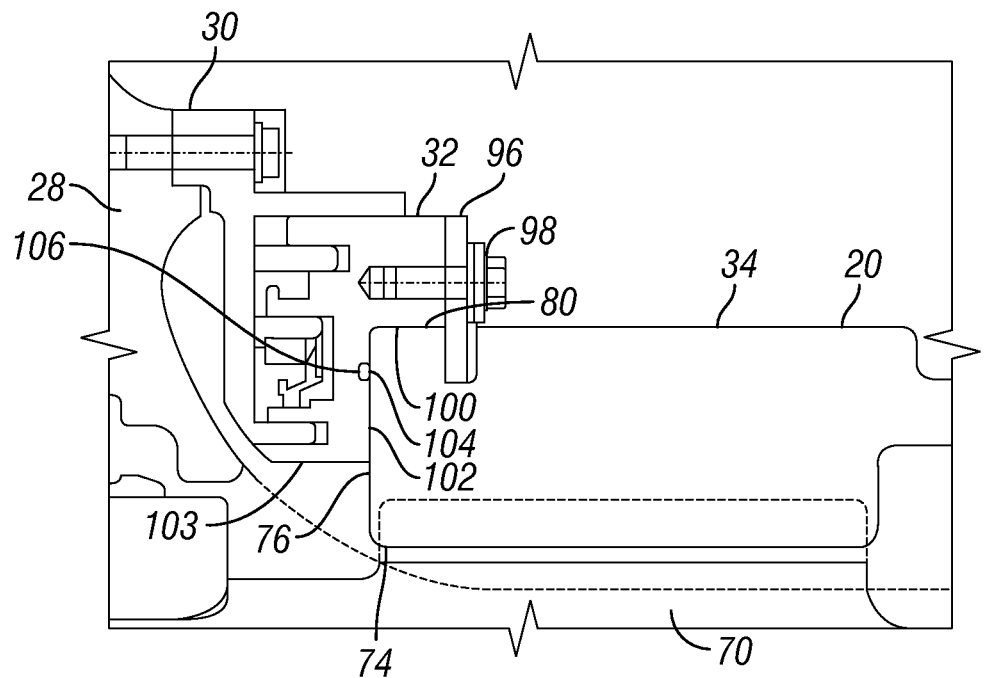
FIG. 9 shows a side sectioned partial view of the torque tube shown in FIGS. 6-8, assembled with a seal body, an oil seal ring, and a wheel frame of the wheel drive assembly shown in FIG. 5.

FIG. 9 shows a detail view from FIG. 5, more clearly illustrating assembly and interaction of the oil seal ring 30, seal body 32, and ring gear 34. As shown in FIG. 9, the seal body 32 can be attached onto the ring gear 34 by way of a mechanism including a plurality of clamp plates 96 and a plurality of bolts 98. The clamp plates 96, further discussed below with reference to FIG. 10, seat in the clamping groove 82. The bolts 98 draw the seal body 32 up to the clamp plates 96, thereby establishing an interference fit between the radially outward facing mating surface 80 of the ring gear 34 and a radially inward facing mating surface 100 of the seal body 32.

Because interference fits rely upon compressive stresses in the fitted parts, superimposed stress profiles during operation of moving parts can periodically relax an interference fit. This, in turn, could lead to the creation of a leakage path between the interference surfaces. For example, in operation the internal teeth 74 of the ring gear 34 engage with teeth on each of the pinion gears 70, as shown in FIG. 5. Torque is transferred from the electric motor rotor 58 to the ring gear 34, via the shafts 60 and 64 and the gears 66, 68, 70. The torque tube 26 further transfers torque from the ring gear 34 to the hub flange 38, and then to the wheel hub 22. In an OHV such as vehicle 10, the transferred torque may be on the order of ten to twenty thousand foot-pounds.

In view of the potential effects of this torque on an interference fit, the axial cross-section of the torque tube 26 is configured to direct shearing stresses away from the mating surface 80. In particular, the barrel portion 36 is joined to the ring gear 34 via the frustoconical portion 90, which merges with the ring gear shoulder 88 at a radial location disposed radially inward from the mating surface 80. In certain embodiments, the frustoconical portion 90 merges with the shoulder 88 at a radial location that also is disposed substantially radially inward from a bottom surface of the clamping groove 82. By joining the barrel portion 36 to the ring gear 34 at a radial location inward of the mating surface 80, rigidity of the mating surface 80 is enhanced during operation of the wheel drive assembly 16.

The torque tube 20 further includes a sealing surface 76 that engages a complementary surface 102 on the seal body 32. In some embodiments, the two sealing surfaces 76, 102 are flat or substantially flat. In selected embodiments, the two sealing surfaces are radially uniplanar.

To further limit the potential for oil leakage, the uniplanar profiles of surfaces 76, 102 permit inclusion of a seal element groove 104 on either surface. In selected embodiments, the seal element groove 104 is indented into the sealing surface 100 formed on the seal body 32. The seal element groove 104 extends around a common axis of rotation shared by the seal body 32 and the ring gear 34. In use, the seal element groove 104 houses a seal element 106, which, in certain embodiments, may be a deformable seal element such as an O-ring.

Figure 10:
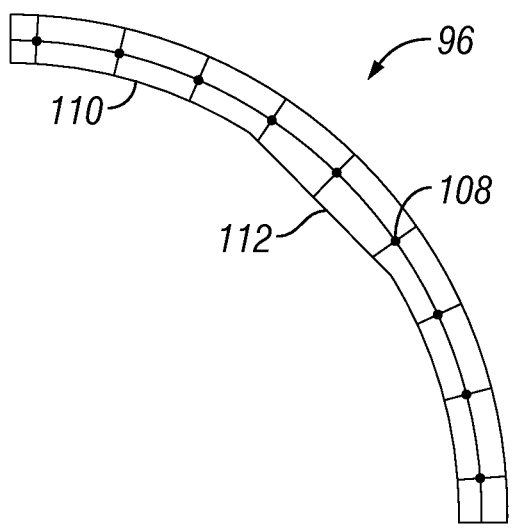
FIG. 10 shows a side view of a clamp plate in accordance with an embodiment of the present invention for use to secure together the seal body and the torque tube shown in FIG. 9.

Referring now to FIG. 10, an embodiment of the present invention may further include an anti-rotation mechanism to attach the seal body 32 to the ring gear 34. The anti-rotation mechanism includes four clamp plates 96, each clamp plate being generally arcuate in shape and extending around about one quarter of a circle (about ninety degrees). Each clamp plate 96 has a generally concave radially inward surface 110, on which a flattened or flats portion 112 corresponds to one of the secant lands 86 formed in the clamping groove 82 of the ring gear 34. When assembled together, the flattened portions 112 of the clamp plates 96 rotationally lock the clamp plates to the secant lands 86 formed on the ring gear 34. The seal body 32 thereby is locked against rotation relative to the ring gear 34. In the exemplary embodiment shown in FIG. 10, the flattened portion 112 of each clamp plate 96 may extend across about one quarter to one third of the arc of the clamp plate. In selected embodiments, the flattened portion of each clamp plate may extend across about twenty five to thirty five degrees of arc.

In use, an embodiment of the invention may include a torque tube for use in an OHV, e.g., a 200+ ton mining haul truck. The OHV comprises at least two wheel assemblies. Each wheel assembly includes a torque transfer mechanism, which includes the inventive torque tube. The torque tube includes a ring gear having a first axial end, a second axial end opposite the first axial end, an inner surface including a plurality of teeth, and an outer surface with a mating portion (e.g. mating surface 80 and/or related structures) formed adjacent to the first axial end of the ring gear. The torque tube also may have a barrel portion joined to the second axial end of the ring gear at a radial location inward from a radial location of the mating portion. The barrel portion may extend axially away from the ring gear to a flanged portion of the torque tube, thereby providing for torque transfer from the ring gear to the flanged portion of the torque tube. The mating portion of the ring gear may be coupled by an interference fit to an oil seal mounted on the mating portion during torque transfer between the ring gear and the barrel portion. The ring gear may further include a flat, or substantially flat, sealing portion formed on the first axial end, the sealing portion operable to prevent leakage, if any, of oil from between the ring gear and a complementary sealing surface of an oil seal mounted on the mating portion of the ring gear. The outer surface of the ring gear proximate to the mating portion may include a clamping groove, which may have a bottom surface. The barrel portion may be joined to the ring gear at a location radially inward from the bottom surface of the clamping groove. The mating portion of the ring gear includes one or more flat portions formed as secants to the outer surface of the ring gear. For example the flat portions may be formed at the bottom surface of the clamping groove.

Other embodiments of the invention relate to a wheel assembly for an OHV (e.g., a 200+ ton mining haul truck). The wheel assembly includes a torque transfer mechanism or apparatus. The torque transfer apparatus includes a ring gear, an annular attachment, and a barrel portion. The ring gear defines an axis and has a first axial end, a second axial end opposite the first axial end, a radially inward facing surface including a plurality of teeth, and a radially outward facing surface with a mating portion formed proximate to the first axial end of the ring gear. At the second axial end of the ring gear, the barrel portion may be joined to the ring gear, for example by welding, or by friction welding, at a radial location inward from a radial location of the mating portion, and extending axially away from the ring gear to a flanged portion. The inventive apparatus also may include an annular attachment having an inward mating surface joined by an interference fit to the mating portion of the ring gear. By appropriate positioning of the mating portion and the barrel portion, the interference fit may be maintained while torque is transferred between the ring gear and the barrel portion. Moreover, the ring gear may include an outward facing surface portion defining a clamping groove between the mating portion and the second axial end of the ring gear, and a bottom portion of the groove having a groove radius. The barrel portion may be joined to the second axial end of the ring gear at a radial location inward from the groove radius. Additionally, a clamping ring seated in the clamping groove may be fastened to the annular attachment for establishing the interference fit. The ring gear may also include a flat, or substantially flat, first sealing surface formed on the first end, and the annular attachment further includes a substantially flat second sealing surface facing the first sealing surface. Accordingly, torque can be transferred between the ring gear and the barrel portion without opening a leakage path between the first and second sealing surfaces. Sealing between the annular attachment and the ring gear may be enhanced by including a ring groove formed in the second sealing surface. Optimally, a seal ring held in the ring groove remains compressed against the first sealing surface of the ring gear while torque is transferred between the ring gear and the barrel portion. Optionally, the first and second sealing surfaces are disposed radially outward from the barrel portion.

Yet other embodiments of the invention relate to an OHV (e.g., a 200+ ton mining haul truck). The WV having at least two wheel assemblies. Each wheel assembly including a torque transfer mechanism or apparatus. The torque transfer apparatus includes a ring gear, an annular attachment, and a barrel portion. The ring gear defines an axis and has a first axial end, a second axial end opposite the first axial end, a radially inward facing surface including a plurality of teeth, and a radially outward facing surface with a mating portion formed proximate to the first axial end of the ring gear. At the second axial end of the ring gear, the barrel portion may be joined to the ring gear, for example by welding, or by friction welding, at a radial location inward from a radial location of the mating portion, and extending axially away from the ring gear to a flanged portion. The inventive apparatus also may include an annular attachment having an inward mating surface joined by an interference fit to the mating portion of the ring gear. By appropriate positioning of the mating portion and the barrel portion, the interference fit may be maintained while torque is transferred between the ring gear and the barrel portion. Moreover, the ring gear may include an outward facing surface portion defining a clamping groove between the mating portion and the second axial end of the ring gear, and a bottom portion of the groove having a groove radius. The barrel portion may be joined to the second axial end of the ring gear at a radial location inward from the groove radius. Additionally, a clamping ring seated in the clamping groove may be fastened to the annular attachment for establishing the interference fit. The ring gear may also include a flat, or substantially flat, first seating surface formed on the first end, and the annular attachment further includes a substantially flat second sealing surface facing the first sealing surface. Accordingly, torque can be transferred between the ring gear and the barrel portion without opening a leakage path between the first and second sealing surfaces. Sealing between the annular attachment and the ring gear may be enhanced by including a ring groove formed in the second sealing surface. Optimally, a seal ring held in the ring groove remains compressed against the first sealing surface of the ring gear white torque is transferred between the ring gear and the barrel portion. Optionally, the first and second sealing surfaces are disposed radially outward from the barrel portion.

In selected embodiments of the invention, a mating portion of a ring gear may include flats formed as secants of the outer surface of the ring gear, and an inward mating surface of an annular attachment may include inwardly flattened segments complementary to the flats formed on the mating portion of the ring gear.

Another embodiment of the invention relates to a method of manufacturing a torque transfer apparatus, by joining a ring gear to a barrel portion. The ring gear has a first axial end, a second axial end opposite the first axial end, a radially inward facing surface including a plurality of teeth, and a radially outward facing surface with a mating portion formed proximate to the first axial end of the ring gear. The ring gear is joined to the barrel portion at about the second axial end of the ring gear, and at a radial location inward from a radial location of the mating portion, so that the barrel portion extends axially away from the ring gear. For example, the barrel portion may be joined to the second axial end of the ring gear by welding, or by friction welding. Other appropriate joining methods may occur to those of ordinary skill. Optionally, an annular attachment may be fitted to the mating portion of the ring gear. The annular attachment may be fitted by installing a clamping plate onto the ring gear at a radial location outward of the barrel portion, and drawing the annular attachment toward the clamping plate over the mating portion of the ring gear. Alternatively, the annular attachment may be fitted by heating the annular attachment. Selected embodiments may include forming a plurality of flattened regions on the mating portion of the outer surface of the ring gear.

According to one aspect, with reference to FIG. 8, an axis (axial direction) of the torque tube is the direction of the center axis of rotation, namely, horizontal from the perspective of FIG. 8, whereas a radius (radial direction) of the torque tube is the direction of a radius or diameter of the circle defined by the ring gear, namely, vertical from the perspective of FIG. 8.

One of ordinary skill in the art will understand that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. White the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those ordinarily skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described torque tube, torque transfer apparatus, and method for manufacturing a torque transfer apparatus, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A torque tube comprising:
   a ring gear having a first axial end, a second axial end opposite the first axial end, an inner surface including a plurality of teeth, and an outer surface with a mating portion formed adjacent to the first axial end of the ring gear;
   a frustoconical portion extending from the second axial end of the ring gear; and
   a barrel portion joined to the frustoconical portion at a radial location inward from a radial location of the mating portion and extending axially away from the ring gear, the barrel portion having a hub flange protruding radially outward from the barrel portion that is configured for operative coupling to a wheel hub;
   wherein the torque tube provides indirect coupling between the ring gear and the wheel hub and provides a means of torque transfer from the ring gear, to the barrel portion, to the hub flange and to the wheel hub.

2. The torque tube as claimed in claim 1, wherein the mating portion of the ring gear is coupled to an oil seal mounted on the mating portion by an interference fit that is substantially maintained during torque transfer between the ring gear and the barrel portion.

3. The torque tube as claimed in claim 1, wherein the ring gear further includes a flat, or substantially flat, sealing portion formed on the first axial end, the sealing portion operable to prevent leakage, if any, of oil from between the ring gear and a complementary sealing surface of an oil seal mounted on the mating portion of the ring gear.

4. The torque tube as claimed in claim 1, wherein the outer surface of the ring gear proximate to the mating portion defines a clamping groove.

5. The torque tube as claimed in claim 4, wherein the clamping groove has a bottom surface, and the barrel portion is joined to the ring gear at a location radially inward from the bottom surface of the clamping groove.

6. The torque tube as claimed in claim 1, wherein the mating portion of the ring gear includes one or more flat portions formed as secants to the outer surface of the ring gear.

7. A torque transfer apparatus, comprising:
   a ring gear defining an axis and having a first axial end, a second axial end opposite the first axial end, a radially inward facing surface including a plurality of teeth, and a radially outward facing surface with a mating portion formed proximate to the first axial end of the ring gear;
   an annular attachment having an inward mating surface joined by an interference fit to the mating portion formed proximate to the first axial end of the ring gear; and
   a barrel portion joined to the second axial end of the ring gear at a radial location inward from a radial location of the mating portion, and extending axially away from the ring gear to a flanged portion, the flanged portion being configured for coupling to a wheel hub;
   wherein the torque transfer apparatus provides indirect coupling between the ring gear and the wheel hub; and
   wherein the interference fit at the mating portion is substantially maintained while torque is transferred between the ring gear and the flanged portion of the barrel portion.

8. The apparatus as claimed in claim 7, wherein the radially outward facing surface of the ring gear has an outward facing clamping groove between the mating portion and the second axial end of the ring gear, and a bottom portion of the groove having a groove radius.

9. The apparatus as claimed in claim 8, wherein the barrel portion is joined to the second axial end of the ring gear at a radial location substantially inward of the groove radius.

10. The apparatus as claimed in claim 8, further comprising a clamping ring seated in the clamping groove, and fastened to the annular attachment for establishing the interference fit.

11. The apparatus as claimed in claim 7, wherein the ring gear further includes a flat, or substantially flat, first sealing surface formed on the first end, and the annular attachment further includes a substantially flat second sealing surface facing the first sealing surface; and
   torque being transferrable between the ring gear and the barrel portion without opening a leakage path between the first and second sealing surfaces.

12. The apparatus as claimed in claim 11, wherein the annular attachment further includes a ring groove formed in the second sealing surface, and a seal ring held in the ring groove remains compressed against the first sealing surface of the ring gear while torque is transferred between the ring gear and the barrel portion.

13. The apparatus as claimed in claim 11, wherein the first and second sealing surfaces are disposed radially outward from the barrel portion.

14. The apparatus as claimed in claim 7, wherein the mating portion of the ring gear includes flats formed as secants of the outer surface of the ring gear, and the inward mating surface of the annular attachment includes inwardly flattened segments complementary to the flats formed on the mating portion of the ring gear.

15. A method of manufacturing a torque transfer apparatus, comprising:
   joining a ring gear to a barrel portion, wherein the ring gear has a first axial end, a second axial end opposite the first axial end, a radially inward facing surface including a plurality of teeth, and a radially outward facing surface with a mating portion formed proximate to the first axial end of the ring gear, and wherein the ring gear is joined to the barrel portion at about the second axial end of the ring gear, and at a radial location inward from a radial location of the mating portion, the barrel portion extending axially away from the ring gear; and
   forming a flange portion that protrudes radially outward from the barrel portion and configuring the flange portion for coupling to a wheel hub;
   wherein the torque transfer apparatus is configured to provide indirect coupling between the ring gear and the wheel hub and to provide a means of torque transfer from the ring gear, to the barrel portion, to the flange portion and to the wheel hub.

16. The method as claimed in claim 15, further comprising fitting an annular attachment to the mating portion of the ring gear.

17. The method as claimed in claim 16, wherein fitting an annular attachment includes installing a clamping plate onto the ring gear at a radial location outward of the barrel portion, and drawing the annular attachment toward the clamping plate over the mating portion of the ring gear.

18. The method as claimed in claim 16, wherein fitting an annular attachment includes heating the annular attachment.

19. The method as claimed in claim 15, further comprising forming a plurality of flattened regions on the mating portion of the outer surface of the ring gear.

* * * * *